United States Patent [19]

Taylor

[11] Patent Number: 5,285,696
[45] Date of Patent: Feb. 15, 1994

[54] BAR END ASSEMBLY ATTACHABLE TO THE STEERER BARS OF BICYCLE HANDLEBAR SYSTEMS

[75] Inventor: Arnold Taylor, Huntington Beach, Calif.

[73] Assignee: Answer Products, Inc., Valencia, Calif.

[21] Appl. No.: 948,363

[22] Filed: Sep. 21, 1992

[51] Int. Cl.⁵ .............................................. B62K 21/12
[52] U.S. Cl. .................................. 74/551.1; 74/551.4; 74/551.8
[58] Field of Search ................. 74/551.1, 551.3, 551.4, 74/551.8, 551.9; 403/367, 368, 369, 370, 371, 372, 373, 374

[56] References Cited

U.S. PATENT DOCUMENTS

| | | | |
|---|---|---|---|
| 2,999,706 | 9/1961 | Wilcox | 403/370 |
| 4,462,267 | 7/1984 | Shimano | 74/551.1 X |
| 5,033,325 | 7/1991 | Giard, Jr. | 74/551.1 X |

FOREIGN PATENT DOCUMENTS

| | | | |
|---|---|---|---|
| 21885 | 9/1897 | United Kingdom | 74/551.4 |
| 395597 | 7/1933 | United Kingdom | 74/551.3 |

*Primary Examiner*—Rodney H. Bonck
*Assistant Examiner*—Ryan W. Massey
*Attorney, Agent, or Firm*—Thomas I. Rozsa; Tony D. Chen

[57] ABSTRACT

The present invention is an apparatus and a method for attaching a bar end to an end portion of a steerer bar to construct a bicycle handlebar system, where the end portion of the steerer bar is a thin wall hollow tubing with two opposite surfaces including an exterior surface and an interior surface. The present invention bar end assembly includes a bar end having fastening assembly engageable to one of the two opposite surfaces of the hollow tubing for attaching the bar end to the steerer bar, and an extended brace engageable to another one of the two opposite surfaces of the hollow tubing for supporting the hollow tubing, so that it will not be damaged by any stress exerted by the fastening assembly.

23 Claims, 2 Drawing Sheets

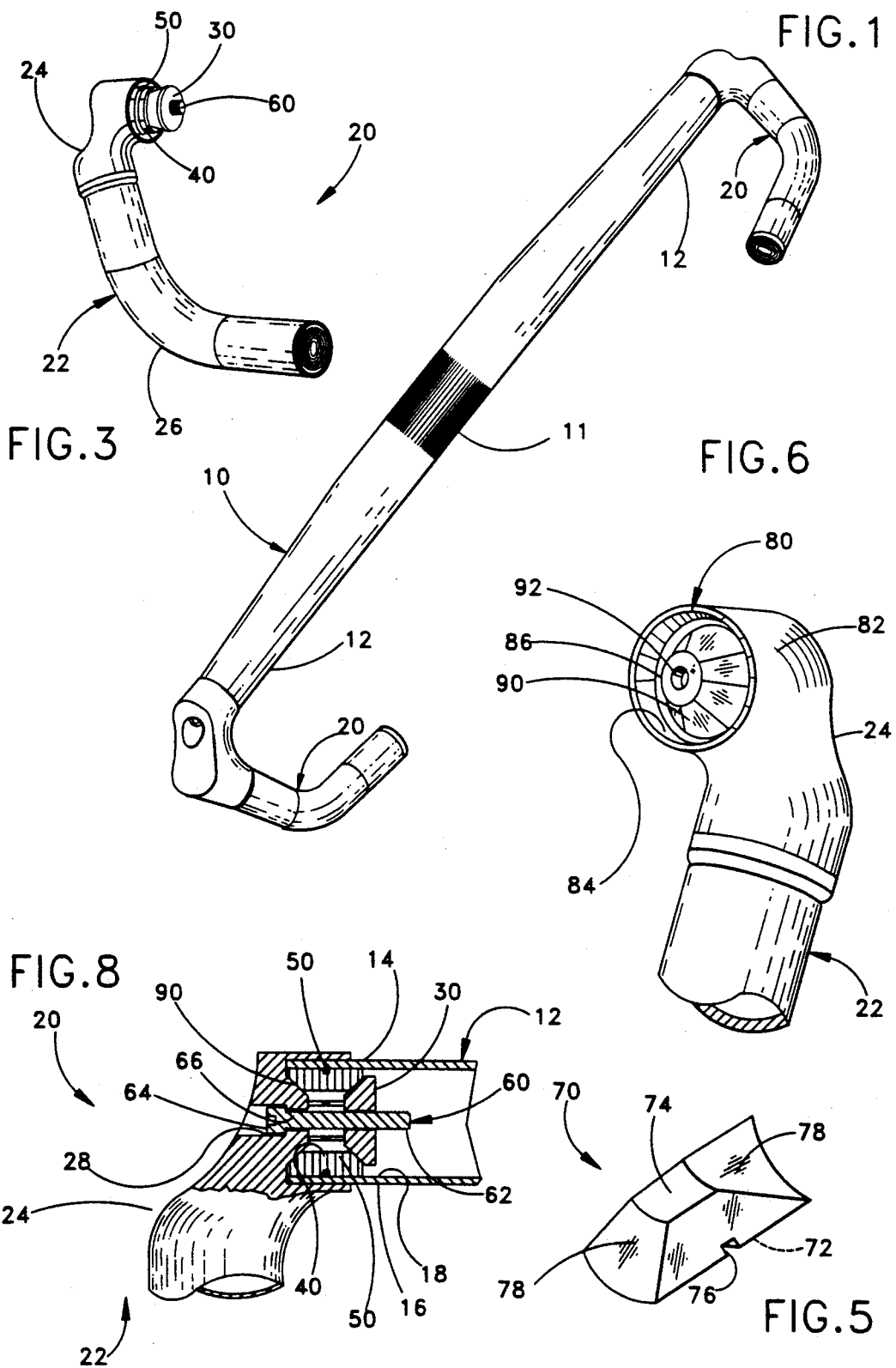

BAR END ASSEMBLY ATTACHABLE TO THE STEERER BARS OF BICYCLE HANDLEBAR SYSTEMS

BACKGROUND OF THE INVENTION

1. Field of the Invention

The present invention relates to the field of design and manufacturing of bicycle handlebar systems. More particularly, the present invention relates to the field of design and manufacturing of end bar assemblies for attachment to bicycle steerer bars including mountain bicycle steerer bars.

2. Description of The Prior Art

The present invention is primarily related to the field of the handlebar systems of bicycles such as mountain bicycles. However, the present invention is also closely related to the field of other types of bicycles, such as regular street bicycles, other offroad bicycles, dirt bikes, all terrain bicycles, etc. Furthermore, the present invention is generally related to cycles and other equipment with handlebars, such as bicycles, motorcycles and jet skis. In the following description, the terms "bicycle", "bike" and "mountain bike", etc., are used somewhat interchangeably and should be construed as encompassing all of, but not limited to, the above mentioned meanings.

A typical mountain bicycle handlebar system includes a steerer bar and two bar end assemblies. The steerer bar is generally horizontally disposed and has a central portion and two opposite end potions. Each end portion terminates at a respective distal end. The central portion of the steerer bar is attached to a generally vertical stem which is in turn connected to the front fork of the bicycle. Each bar end assembly includes an angled bar end and an attachment means. The angled bar end has a proximal end and an angled grip portion, where the proximal end is attached to a respective distal end of the steerer bar by the attachment means. The bar end assemblies are added to the steerer bar to improve leverage of a mountain bicycle handlebar system in climbing situations, which are often experienced in riding mountain bicycles.

Most conventional bicycle steerer bars of bicycle handlebar systems are manufactured in hollow tubing structures. Therefore, the end portions of bicycle steerer bars are typically hollow and cylindrical in shape. Each hollow cylindrical end portion has a cylindrical sidewall with an exterior surface and an interior surface, where the interior surface defines a hollow bore. The essential function of the attachment means of a bar end assembly is therefore to attach the proximal end of the angled bar end to the hollow cylindrical end portion of the steerer bar.

There are two conventional types of bar end assemblies for attaching the proximal end of an angled bar end to a respective distal end of the steerer bar. In the first conventional type of bar end assembly, the attachment means includes a frustum-shaped wedge member engaging with the interior surface of the hollow cylindrical end portion of the steerer bar and tightened from inside the hollow cylindrical end portion of the steerer bar. This is often known as the "wedge" type attachment means for bicycle bar end assemblies. In the second conventional type of bar end assembly, the attachment means includes a C-shaped clamp member engaging with the exterior surface of the hollow cylindrical end portion of the steerer bar and tightened from outside the hollow cylindrical end portion. This is often known as the "clamp" type attachment means for bicycle bar end assemblies.

Both the wedge type and the clamp type attachment means are widely used in bicycle bar end assemblies. However, there has been a significant problem in using these types of attachment means. The problem is that oftentimes the hollow cylindrical end portions of the steerer bars are severely damaged when the attachment means are tightened to the end portions. When the wedge type attachment means are used, the hollow cylindrical end portions of the steerer bars are often cracked or split outwardly. When the clamp type attachment means are used, the hollow cylindrical end portions of the steerer bars are often crimped or wrinkled inwardly.

It is therefore desirable to have a new type of attachment means for bar end assemblies, which can be used in bicycle handlebar systems to attach bar ends to steerer bars without damaging the end portions of the steerer bars.

SUMMARY OF THE INVENTION

The present invention is a bar end assembly attachable to the steerer bars of bicycle handlebar systems.

It is known that a typical bicycle handlebar system includes a steerer bar and two bar end assemblies. Each bar end assembly further includes an angled bar end an attachment means. It is also known that a wedge type and a clamp type attachment means have been utilized in bicycle bar end assemblies. The wedge type attachment means attaches the angled bar end to the hollow cylindrical end portion of the steerer bar from inside and engages with the interior surface of the end portion of the steerer bar. The clamp type attachment means attaches the angled bar end to the hollow cylindrical end portion of the steerer bar from outside and engages with the exterior surface of the end portion of the steerer bar. These two conventional attachment means often result in severe splitting or crimping damage at the end portions of the steerer bars.

It has been discovered, according to the present invention, that the cause of the damage to the hollow cylindrical end portions of steerer bars which result from using the conventional wedge type or clamp type attachment means is that the thickness of the sidewall of the hollow cylindrical end portions of many current high performance bicycle handlebar systems are substantially reduced. For example, in many high performance handlebar systems, the thickness of the sidewall of the hollow cylindrical end portions of the steerer bars is only 0.035 to 0.065 inch. When the bar ends are attached to the end portions of the steerer bars, the thin sidewall of the end portions of the steerer bars cannot withstand the expanding stress exerted by the inner wedge member of the wedge type attachment means, or the clamping stress exerted by the outer clamp member of the clamp type attachment means, and become split or crimped.

It has also been discovered, according to the present invention, that if a bar end is attached to a hollow cylindrical end portion of a steerer bar by an attachment means, the attachment means provides an extended cylindrical outer sleeve which conforms with the exterior surface of the thin sidewall of the end portion. Then the outer sleeve will provide support or backing to the thin sidewall of the end portion and prevent it from being cracked or split. Further, when an inner wedge member engages with the interior surface of the thin sidewall of the end portion and is tightened from inside of the hollow cylindrical end portion, it will exert an expanding stress on the thin sidewall of the end portion of the steerer bar to retain the bar end on the steerer bar without cracking or otherwise damaging the steerer bar.

It has been further discovered that prior art bar end assemblies often require a longer attachment length on the end portions of the steerer bars. This is because prior art bar end attachment means engage with either the interior or the exterior but only one side of the hollow sidewall of the end portion. To obtain sufficient strength in the bar end attachments, the attachment lengths in prior art steerer bars are typically not less than 1 inch. However, according to the to the present invention, if the bar end attachment means attaches to both the interior and exterior sides of the hollow sidewall of the end portion, then for the same attachment length the contacting area is doubled. Therefore the present invention can achieve the same sufficient strength in the bar end attachments, but reduce the attachment lengths by as much as 50% to about only ½ inch.

It has additionally been discovered that at the ends of many steerer bars the thin wall tubings are often slightly rolled-in due to the manufacturing process. This type of rolled-in ends often makes it very difficult to withdraw the wedge member from the hollow end portion of the steerer bar after the wedge member has been engaged therein. However, according to the present invention, if an expandable segmented nut is bonded by an elastic retention ring, then when the segmented nut is not engaged, the retention ring will force the segmented nut to reduce to its original size, so it can be easily removed from the hollow end portion of a steerer bar, even if it has a rolled-in end.

It is therefore an object of the present invention to provide a new type of bar end assembly for bicycle handlebar systems. Each new bar end assembly includes a bar end and an attachment means for attaching the bar end to a steerer bar which has very thin sidewall at its end portions. The attachment means includes an inner segmented nut which is expandable and engageable with the interior surface of the thin sidewall of the end portion from inside of the hollow cylindrical end portion to attach the bar end to the steerer bar. The attachment means further includes an extended outer sleeve which conforms with the exterior surface of the thin sidewall of the end portion, which provides support to the thin sidewall of the end portion and prevents it from being cracked or split when the inner segmented nut is expanding and exerts outward stress on the interior surface of the thin sidewall of the end portion.

It is also an object of the present invention to provide a new type of bar end assembly for bicycle handlebar systems. The new type of bar end assembly can maintain a tight and secure attachment of bar ends and steerer bars in bicycle handlebar systems, where the attachment means can nonrotatably and nonslidably mount the bar ends to the hollow cylindrical end portions of the steerer bars, without any potential damage to the thin sidewalls of the end portions of the steerer bars.

It is another object of the present invention to provide a new type of bar end assembly for bicycle handlebar systems. The new type of bar end assembly has an expandable segmented nut which is bonded by an elastic retention ring, so that when the segmented nut is not engaged, the retention ring will force the segmented nut to reduce to its original size. Therefore when it is desirable to detach the bar end assembly from the steerer bar, the segmented nut can be easily removed from the hollow end portion of a steerer bar, even if the steerer bar has a rolled-in end.

It is a further object of the present invention to provide a new type of bar end assembly for bicycle handlebar systems. The new type of bar end assembly can render a fast and simple attachment of bar ends and steerer bars in bicycle handlebar systems, where the attachment means are readily accessible from outside of the bar end assemblies and the steerer bars, and can be fastened quickly and easily without using any complicated tools.

It is still another object of the present invention to provide a new type of bar end assembly for bicycle handlebar systems. The new type of bar end assembly can reduce the clamping length at the end portions of the steerer bars by as much as 50%, yet without sacrificing the strength of the attachment.

It is an additional object of the present invention to provide a new type of bar end assembly for bicycle handlebar systems. The new type of bar end assembly is manufactured and assembled with low cost, yet affords durable and lasting applications on bicycle handlebar systems.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of a bicycle handlebar system, showing the present invention bar end assembly attached to the two ends of a steerer bar.

FIG. 3 is a perspective view of the present invention bar end assembly.

FIG. 5 is a perspective view of a segment of the expandable segmented nut of the present invention bar end assembly.

FIG. 6 is a perspective view of the outer sleeve member and fixed wedge member of the present invention bar end assembly.

FIG. 8 is a partial cross-sectional view of the present invention bar end assembly, after it is attached to the hollow cylindrical end portion of the steerer bar.

DESCRIPTION OF THE PREFERRED EMBODIMENT

Figure 7:
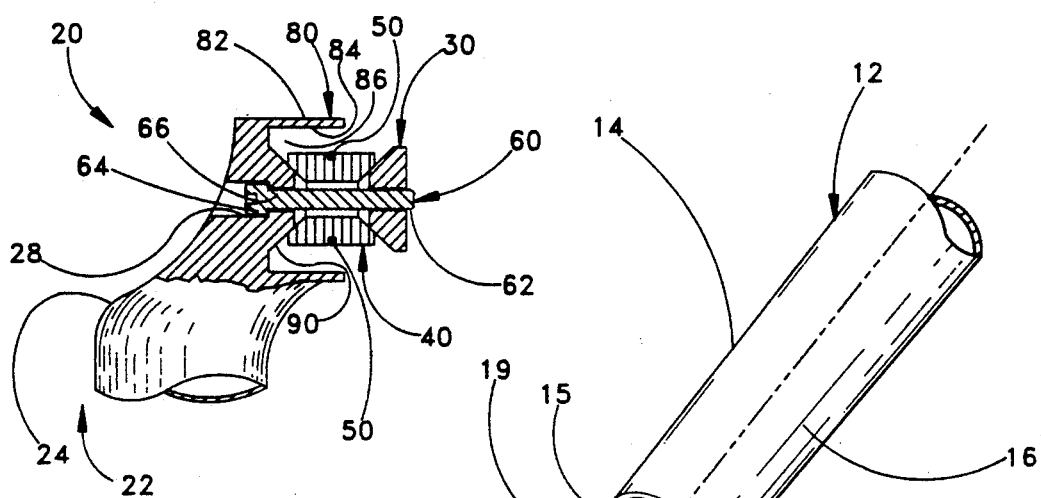
FIG. 7 is a partial cross-sectional view of the present invention bar end assembly, before it is attached to the hollow cylindrical end portion of the steerer bar.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, there is shown a perspective view of a bicycle handlebar system. The handlebar system includes a steerer bar 10 and two present invention bar end assemblies 20 attached to the steerer bar 10. The steerer bar 10 has a central portion 11 and two opposite end portions 12. The central portion 11 of the steerer bar 10 is usually attached to a steerer stem which is in turn connected to the front fork of the bicycle (not shown). The central portion may be thickened for added strength. The steerer bar 10 is tapered from the central portion 11 to the two opposite end portions 12, which are in turn generally cylindrical shaped. The bar end assemblies 20 are added to the steerer bar 10 to improve leverage of a mountain bicycle handlebar system in climbing situations, which are often experienced in riding mountain bicycles. The two bar end assemblies 20 are symmetrically attached to the two opposite end portions 12 of the steerer bar 10. Since the two bar end assemblies 20 are symmetric, only one bar end assembly 20 will be discussed in the following description.

Figure 2:
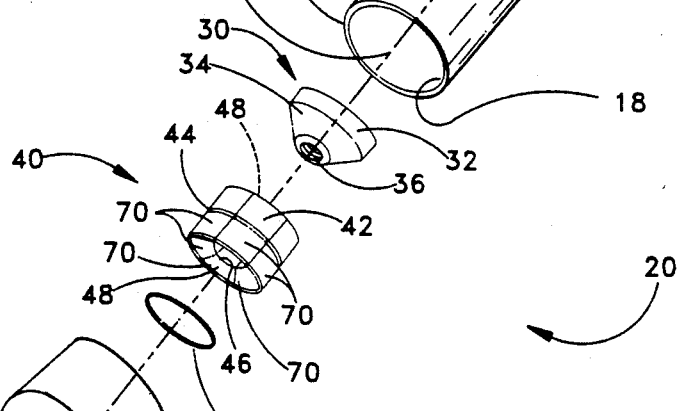
FIG. 2 is an exploded perspective view of the present invention bar end assembly and a hollow cylindrical end portion of the steerer bar.

Referring to FIG. 2, there is shown an exploded perspective view of the present invention bar end assembly 20 and a hollow cylindrical end portion 12 of the steerer bar 10. The end portion 12 of steerer bar 10 is a hollow cylinder with a thin sidewall 14 which terminates at the distal end 15. The thin sidewall 14 has a cylindrical exterior surface 16 and cylindrical interior surface 18 which defines an internal bore 19.

Referring to FIGS. 2 and 3, the present invention bar end assembly 20 includes a bar end 22 and an attachment means. Angled bar end 22 has a proximal end 24 and an angled grip portion 26, where the proximal end 24 of the bar end 22 is attached to a respective distal end portion 12 of the steerer bar 10 by the attachment means. The attachment means includes a movable wedge nut 30, an expandable segmented nut 40, an elastic retention ring 50, a threaded bolt 60, and two other components which will be introduced and described later. The proximal end 24 has a through bore 28 for accommodating threaded bolt 60.

The movable wedge nut 30 of the present invention bar end assembly 20 has a cylindrical section 32 and a frustum section 34. The movable wedge nut 30 also has a through threaded bore 36 for accommodating screw bolt 60, so that movable wedge nut 30 can be threaded onto threaded bolt 60. It is conceivable that the cylindrical section 32 and the frustum section 34 of the movable wedge nut 30 may be two separate pieces. However, in the preferred embodiment of the present invention, the cylindrical section 32 and the frustum section 34 of the movable wedge nut 30 are integrally formed, that is, the movable wedge nut 30 is a unitary piece.

Figure 4:
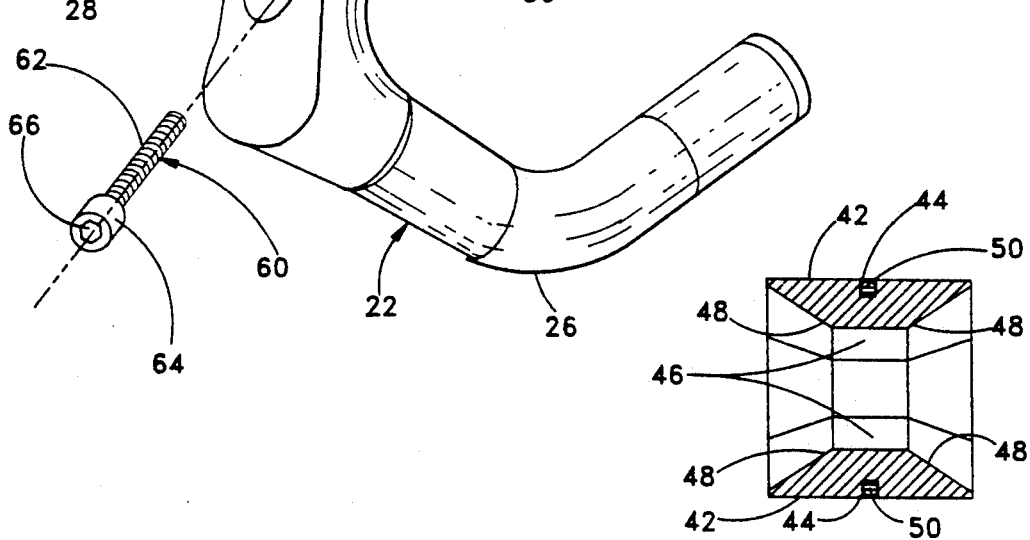
FIG. 4 is a cross-sectional view of the expandable segmented nut of the present invention bar end assembly.

Referring to FIGS. 2 and 4, the expandable segmented nut 40 of the present invention bar end assembly 20 is generally hollow cylindrical shaped with an exterior surface 42 and a threaded interior bore 46. The expandable segmented nut 40 further has a circular groove 44 on its exterior surface 42 for accommodating the elastic retention ring 50. In addition, the expandable segmented nut 40 has two opposite ramp surfaces 48.

The expandable segmented nut 40 splits radially into at least two segments. In the preferred embodiment of the present invention, the expandable segmented nut 40 has six (6) segments 70. Referring to FIG. 5, there is shown a perspective view of one of the segments 70 of the expandable segmented nut 40. Segment 70 has a convex outer surface 72 which is part of the exterior cylindrical surface 42 of the expandable segmented nut 40, and a concave inner surface 74 which forms part of the interior cylindrical bore 46 of the expandable segmented nut 40. The convex outer surface 72 of segment 70 has a groove 76 which is a section of the circular groove 44 at the exterior cylindrical surface 42 of the expandable segmented nut 40. Segment 70 further has two opposite inclined surfaces 78, which are respective portions of the two opposite ramp surfaces 48 of the expandable segmented nut 40.

Once again referring to FIG. 2, the threaded bolt 60 has an elongated threaded shaft section 62 and a widened head section 64, which has means 66 for receiving a driving tool (not shown), so that the threaded bolt 60 can be threaded. In the preferred embodiment of the present invention the widened head section 64 of the threaded bolt has an Allen recess 66 so that the threaded bolt 60 can be threaded by an Allen screw driver.

Referring to FIG. 6, there is shown a perspective view of the two remaining components of the attachment means of the present invention bar end assembly 20: an extended outer sleeve 80 and fixed wedge nut 90. The extended outer sleeve 80 has an exterior surface 82 and a cylindrical interior surface 84, and is fixed to and extends from the proximal end 24 of bar end 22. In the preferred embodiment of the present invention, the extended outer sleeve 80 is integrally formed with the proximal end 24 of bar end 22, where the exterior surface 82 of extended outer sleeve 80 is smoothly merged with the contour of the proximal end 24 of bar end 22.

The cylindrical interior surface 84 of extended outer sleeve 80 defines a hollow chamber 86, wherein a fixed wedge nut 90 is disposed in a concentric relationship with the extended outer sleeve 80. The fixed wedge nut 90 has a frustum configuration with a through bore 92. In the preferred embodiment of the present invention, the fixed wedge nut 90 is integrally formed with the proximal end 24 of bar end 22, and its bore 92 is aligned with through bore 28 of the proximal end 24 of bar end 22.

Therefore, in the preferred embodiment of the present invention, the extended outer sleeve 80 and the fixed wedge nut 90 are all integrally formed with the proximal end 24 of bar end 22 as a unitary piece. Moreover, the through bore 28 and 92 are continuous and disposed along a concentric axis of the extended outer sleeve 80 and the fixed wedge nut 90.

Referring to FIG. 7, there is shown a partial cross-sectional view of the present invention bar end assembly 20, before it is attached to the hollow cylindrical end portion 12 of steerer bar 10. The extended outer sleeve 80 and the fixed wedge nut 90 are integrally formed with the proximal end 24 of the bar end 22, and the movable wedge nut 30 and the segmented nut 40 are all attached to the proximal end 24 of the bar end 22 by the threaded bolt 60. The segmented nut 40 is bonded by the elastic retention ring 50, and attached between the fixed wedge nut 90 and the movable wedge nut 30. When the movable wedge nut 30 is threaded on the threaded bolt 60 and moves towards the fixed wedge nut 90, the ramp surfaces 48 of the segmented nut can engage with the fixed wedge nut 90 and the movable wedge nut 30 respectively. If the movable wedge nut 30 is continuously threaded on the threaded bolt 60 and moves further towards the fixed wedge nut 90, then the segmented nut 40 will be squeezed to split and expand radially.

When the bar end assembly 20 is so assembled, it is ready to be attached to the cylindrical end portion 12 of the steerer bar 10. The ramp surfaces 48 of the segmented nut 40 are fictionally engaged with the fixed wedge nut 90 and the movable wedge nut 30 because the elastic retention ring 50 exerts a radially inward force on the segmented nut 40. The frictional engagements between the fixed wedge nut 90 and the segmented nut 40, and between the segmented nut 40 and the movable wedge nut 30, prevent the movable wedge nut 30 from rotating. Therefore, when threaded bolt 60 is screwed at its head section 64 from outside of the bar and 22, the movable wedge nut 30 will not rotate with the threaded bolt 60, but rather further threads on the threaded bolt 60 and moves toward the fixed wedge nut 90. The inward movement of the movable wedge nut 30 will further squeeze the segmented nut 40 and make it further split and expand radially.

Referring to FIG. 8, there is shown a cross-sectional view of the present invention bar end assembly 20, after it is attached to the hollow cylindrical end portion 12 of the steerer bar 10. The extended outer sleeve 80 braces upon the thin sidewall 14 of the hollow cylindrical end portion 12, where the interior surface 84 of the extended outer sleeve 80 conforms to and engages with the exterior surface 16 of the thin sidewall 14. When the threaded bolt 60 is further screwed from outside of the bar end 22, the movable wedge nut 30 is continuously thread on the threaded bolt 60 and move towards the fixed wedge nut 90. The segmented nut 40 is then further squeezed to split and expand radially. Finally, the segmented nut 40 is engaged with the interior surface 18 of the thin sidewall 14 of the hollow cylindrical end portion 12, and thereby tightens the bar end 22 to the steerer bar 10.

In the preferred embodiment, the angles of the inclined surfaces of the movable wedge nut 30, the expandable segmented nut 40 and the fixed wedge nut 50 are all 45 degrees. This gives a one-to-one relationship between the distance traveled by the movable wedge nut 40 and the increase of the outer diameter of the segmented nut 40.

One unique feature of the present invention is that the extended outer sleeve 80 provides support to the thin sidewall 14 of the end portion 12 of the steerer bar 10 and prevents it from being cracked or split when the segmented nut 40 is expanding and exerts the radially outward force on the interior surface 18 of the thin sidewall 14 of the end portion 12. The extended outer sleeve 80 therefore serves as a backing brace to sustain the thin sidewall 14 of the end portion 12. It is conceivable that the same principle can be applied to other types of bar end assemblies utilizing clamp type attachment means, where the bar end assemblies can incorporate an inner sleeve engageable with and bracing the interior surface of the thin sidewall of the end portion of the steerer bar from inside to prevent it from being crimped or cracked when the clamp type attachment means is squeezing on and exerts a radially inward force on the exterior surface of the thin sidewall of the end portion.

Another unique feature of the present invention is that the expandable segmented nut 40 provides great flexibility of attaching the bar end 22 to the end portion 12 of steerer bar 10. While the outer diameter of the hollow end portions of steerer bars are often similar, the inner diameter of the hollow end portions of steerer bars are quite different, depending on the thickness of the sidewall thereof. For example, the outer diameter of the end portion of a standard steerer bar is 0.875 inch, but the inner diameter can be anywhere within the range from 0.810 to 0.840 inch. The present invention expandable segmented nut 40 may be used with steerer bars having different inner diameters at their end portions. For example, in a preferred embodiment of the present invention, the outer diameter of the segmented nut 40 is about 0.600 inch when it is not expanded, which allows plenty of room for it to be inserted into the hollow end portion 14 of the steerer bar 10. However, when the segmented nut 40 is fully squeezed by the movable wedge nut 30 and the fixed wedge nut 90, its outer diameter can be increased up to 0.875 inch, so it can engage tightly with the any hollow end portion which has an outer diameter not exceeding 0.875 inch.

A further unique feature of the present invention is that the expandable segmented nut is bonded by an elastic retention ring. Since at the ends of many steerer bars the thin wall tubings are often slightly rolled-in due to the manufacturing process, it is often very difficult to detach the bar end assembly from the hollow end portion of the steerer bar. However, in the present invention the bar end 22 can be easily removed from the steerer bar 10. When the threaded bolt is unscrewed so that the movable wedge nut 30 and the fixed wedge nut 90 no longer squeeze the segmented nut, the segmented nut will reduce back to its original size, such as only 0.600 inch in outer diameter, since the segmented nut 40 is bonded by the elastic retention ring 50. This makes it very easy to remove the segmented nut 40 from the hollow end portion 14 of the steerer bar 10, even if its end 15 is slightly rolled-in.

An additional unique feature of the present invention is that the attachment length of the steerer bar is substantially reduced. The prior art bar end assemblies often requires longer attachment length on the end portions of the steerer bars to obtain adequate attachment strength, because the bar end attachment means only engages with one, i.e., either the interior or the exterior, surface of the hollow end portion. The attachment length in typical prior art steerer bars is about 1 inch. In the present invention, the bar end assembly contacts both the interior and exterior surface of the hollow end portion, so that for the same attachment length the contacting area is doubled. Therefore the present invention can achieve the same sufficient attachment strength but reduce the attachment length on the steerer bar to about ½ inch, which is a 50% reduction in attachment length. This is very desirable because it reduces the stiffness of the end portions of the steerer bars.

The present invention bar end assembly has many advantageous features, including: (a) the present invention bar end assembly has a unique extended outer sleeve which provides support to the thin sidewall of the end portion of the steerer bar and prevents it from being cracked or split when the segmented nut is expanding and exerts the radially outward force on the interior surface of the thin sidewall of the end portion; (b) the present invention bar end assembly has a unique expandable segmented nut which provides great flexibility of attaching the bar end to the end portion of steerer bar which may have different inner diameters; (c) the expandable segmented nut is bonded by an elastic retention ring so that the segmented nut 40 can be easily removed from the hollow end portion of the steerer bar, even if its end is slightly rolled-in; and (d) by using the present invention bar end assemblies, the attachment length of the steerer bars is substantially reduced by as much as 50%, as compared to many prior art bar end assemblies.

The present invention bar end assembly has many other advantages, such as (a) the present invention bar end assembly provides a nonrotatable and nonslidable coupling between the bar end and the steerer bar; (b) the tightening bolt of the present invention bar end assembly is readily accessible from outside of the bar end assemblies and the steerer bars, and can be fastened quickly and easily without using any complicated tools; (c) the present invention bar end assemblies can be manufactured and assembled with very low cost; (d) the present invention bar end assemblies are made of very strong and durable materials which provide long lasting usage on handlebar systems of bicycles or like cycles.

Defined in detail, the present invention is a bar end assembly to be attached to a hollow end portion of a steerer bar for constructing a handlebar system for a bicycle, the bar end assembly comprising: (a) a bar end having a proximal end portion and a distal angled grip portion; (b) an extended outer sleeve extending from said proximal end portion of said bar end and having an interior surface which defines a hollow chamber for accommodating said end portion of said steerer bar; (c) a fixed wedge nut disposed within said hollow chamber; (d) said proximal end portion of said bar end having a through bore extending through said fixed wedge nut; (e) a threaded bolt extending through said through bore at said proximal end portion of said bar end; (f) an expandable segmented nut having two opposite ramp surfaces and a through bore for accommodating said threaded bolt, the segmented nut split radially into a multiplicity of segments which are bonded by an elastic retention ring; (g) a movable wedge nut having a threaded through bore for engaging with said threaded bolt; and (h) said expandable segmented nut disposed between, and its opposite ramp surfaces respectively engaged with, said fixed wedge nut and said movable wedge nut, such that when said bolt is threaded, said movable wedge nut will thread on said bolt and move toward said fixed wedge nut, so that said movable wedge nut and said fixed wedge nut will squeeze said segmented nut therebetween which causes said segmented nut to split and expand radially; (i) whereby said extended outer sleeve can be slid over and brace said hollow end portion, and said segmented nut can be caused to split and expand radially inside said hollow end portion for tightening said bar end to said steerer bar, while said outer sleeve provides protective support to said hollow end portion of said steerer bar so that it will not be damaged by any outward stress exerted by said expanded segmented nut.

Defined broadly, the present invention is a bar end assembly to be attached to an end portion of a steerer bar for constructing a handlebar system, where the end portion of the steerer bar is a hollow tubing having two opposite surfaces including an exterior surface and an interior surface, the bar end assembly comprising, (a) a bar end having fastening means engageable to one of said two opposite surfaces of said hollow tubing for attaching the bar end to said steerer bar; and (b) an extended brace engageable to another one of said two opposite surfaces of said hollow tubing for supporting said hollow tubing so that it will not be damaged by any stress exerted by said fastening means.

Defined alternatively, the present invention is a method for attaching a proximal end portion of a bar end to a hollow end portion of a steerer bar to construct a handlebar system for a bicycle without damaging the hollow end portion of the steerer bar, the method comprising the steps of: (a) having an outer sleeve extended from said proximal end portion of said bar end, where the outer sleeve has an interior surface defining a hollow chamber for accommodating said hollow end portion of said steerer bar; (b) providing an expandable segmented nut which has at least two radially split segments; (c) sliding said outer sleeve over said hollow end portion such that said outer sleeve conforms to and engages with said hollow end portion; and (d) causing said segmented nut to split and expand radially inside said hollow end portion of said steerer bar, and binding said segmented nut to said proximal end portion of said bar end; (e) whereby said outer sleeve provides protective support to said hollow end portion of said steerer bar so that it will not be damaged by any outward stress exerted by said expanded segmented nut.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A bar end assembly to be attached to a hollow end portion of a steerer bar for constructing a handlebar system for a bicycle, the bar end assembly comprising:
  a. a bar end having a proximal end portion and a distal angled grip portion;
  b. an extended outer sleeve extending from said proximal end portion of said bar end and having an interior surface which defines a hollow chamber for accommodating said end portion of said steerer bar;
  c. a fixed wedge nut disposed within said hollow chamber;
  d. said proximal end portion of said bar end having a through bore extending through said fixed wedge nut;
  e. a threaded bolt extending through said through bore at said proximal end portion of said bar end;
  f. an expandable segmented nut having two opposite ramp surfaces and a through bore for accommodating said threaded bolt, the segmented nut split radially into a multiplicity of segments which are bonded by an elastic retention ring;

g. a movable wedge nut having a threaded through bore for engaging with said threaded bolt; and h. said expandable segmented nut disposed between, and its opposite ramp surfaces respectively engaged with, said fixed wedge nut and said movable wedge nut, such that when said bolt is threaded, said movable wedge nut will thread on said bolt and move toward said fixed wedge nut, so that said movable wedge nut and said fixed wedge nut will squeeze said segmented nut therebetween which causes said segmented nut to split and expand radially;

i. whereby said extended outer sleeve can be slid over and brace said hollow end portion, and said segmented nut can be caused to split and expand radially inside said hollow end portion for tightening said bar end to said steerer bar, while said outer sleeve provides protective support to said hollow end portion of said steerer bar so that it will not be damaged by any outward stress exerted by said expanded segmented nut.

2. The invention as defined in claim 1 wherein said outer sleeve is integrally formed with said proximal end portion of said bar end.

3. The invention as defined in claim 1 wherein said fixed wedge nut is integrally formed with said proximal end portion of said bar end.

4. The invention as defined in claim 1 wherein said threaded bolt has a widened head section with means for receiving a driving tool.

5. The invention as defined in claim 1 wherein said elastic retention ring is disposed within a circular exterior groove on said segmented nut.

6. A bar end assembly to be attached to an end portion of a steerer bar for constructing a handlebar system for a mountain bicycle, where the end portion of the steerer bar has a hollow cylindrical sidewall with an exterior surface and an interior surface, the bar end assembly comprising:

a. a bar end having a proximal end portion and a distal angled grip portion;

b. said proximal end portion of said bar end having an integrally extended cylindrical outer sleeve with an exterior surface and an interior surface which conforms with said exterior surface of said sidewall of said end portion and defines a hollow cylindrical chamber for accommodating said end portion of said steerer bar;

c. said proximal end portion of said bar end further comprising a fixed wedge nut integrally formed with said bar end and concentrically disposed within said hollow cylindrical chamber thereof;

d. said proximal end portion of said bar end having a through bore extending through said fixed wedge nut along a concentric axis of said cylindrical outer sleeve and said fixed wedge nut;

e. a bolt having a widened head section with means for adapting a driving tool and an elongated section extending through said through bore at said proximal end portion of said bar end, where at least a portion of said elongated section is a threaded portion;

f. an expandable segmented nut having a cylindrical exterior surface, two opposite ramp surfaces and a through bore for accommodating said elongated section of said bolt, the segmented nut split radially into six segments which are bonded by an elastic retention ring;

g. a movable wedge nut having a threaded through bore for engaging with said threaded portion of said elongated section of said bolt; and h. said expandable segmented nut disposed between and its opposite ramp surfaces respectively engaged with said fixed wedge nut and said movable wedge nut, such that when said bolt is threaded, said movable wedge nut will thread on said bolt and move toward said fixed wedge nut, so that said movable wedge nut and said fixed wedge nut will squeeze said segmented nut therebetween which causes said segmented nut to split and expand radially;

i. whereby said extended outer sleeve can be slid over said end portion of said steerer bar such that said interior surface of said outer sleeve braces said exterior surface of said sidewall of said end portion, and said bolt can be threaded to cause said segmented nut to split and expand radially to engage tightly with said interior surface of said sidewall of said end portion for attaching said bar end to said steerer bar, while said outer sleeve provides protective support to said sidewall of said end portion of said steerer bar so that it will not be damaged by any outward stress exerted by said expanded segmented nut.

7. The invention as defined in claim 6 wherein said elastic retention ring is disposed within a circular groove on said exterior surface of said segmented nut.

8. The invention as defined in claim 6 wherein said movable wedge nut has a cylindrical section and a frustum section, where the frustum section is engageable with said segmented nut.

9. A bar end assembly to be attached to a hollow end portion of a steerer bar for constructing a handlebar system for a cycle, the bar end assembly comprising:

a. a bar end having a proximal end portion and a distal grip portion;

b. an outer sleeve extending from said proximal end portion of said bar end and having an interior surface which defines a hollow chamber for accommodating said end portion of said steerer bar;

c. an expandable segmented nut having at least two radially split segments; and d. means for causing said segmented nut to split and expand radially and binding said segmented nut to said proximal end portion of said bar end;

e. whereby said extended outer sleeve can brace over said hollow end portion, and said segmented nut can be caused to split and expand radially inside said hollow end portion for tightening said bar end to said steerer bar, while said outer sleeve provides protective support to said hollow end portion of said steerer bar so that it will not be damaged by any outward stress exerted by said expanded segmented nut.

10. The invention as defined in claim 9 wherein said outer sleeve is integrally formed with said proximal end portion of said bar end.

11. The invention as defined in claim 9 wherein said at least two segments of said segmented nut are bonded by an elastic retention ring.

12. The invention as defined in claim 9 wherein said means for causing said segmented nut to split and expand radially and binding said segmented nut to said proximal end portion of said bar end includes a movable wedge nut for squeezing said segmented nut to cause it to split and expand radially.

13. The invention as defined in claim 12 wherein said means for causing said segmented nut to split and expand radially and binding said segmented nut to said proximal end portion of said bar end further includes a threaded bolt extending through a bore on said proximal end portion of said bar end and threadedly engaged with said movable wedge nut.

14. The invention as defined in claim 13 wherein said threaded bolt has a widened head section with means for receiving a driving tool.

15. The invention as defined in claim 12 wherein said means for causing said segmented nut to split and expand radially and binding said segmented nut to said proximal end portion of said bar end also includes a fixed wedge nut for squeezing said segmented nut from a direction opposite to said movable wedge nut.

16. The invention as defined in claim 12 wherein said fixed wedge nut is integrally formed with said proximal end portion of said bar end.

17. A bar end assembly to be attached to an end portion of a steerer bar for constructing a handlebar system, where the end portion of the steerer bar is a hollow tubing having two opposite surfaces including an exterior surface and an interior surface, the bar end assembly comprising:
  a. a bar end having fastening means engageable to one of said two opposite surfaces of said hollow tubing for attaching the bar end to said steerer bar;
  b. an extended brace engageable to another one of said two opposite surfaces of said hollow tubing for supporting said hollow tubing so that it will not be damaged by any stress exerted by said fastening means; and
  c. wherein said extended brace is an outer sleeve engageable to said exterior surface of said hollow tubing, and said fastening means includes an expandable segmented nut engageable to said interior surface of said hollow tubing.

18. A method for attaching a proximal end portion of a bar end to a hollow end portion of a steerer bar to construct a handlebar system for a bicycle without damaging the hollow end portion of the steerer bar, the method comprising the steps of:
  a. having an outer sleeve extended from said proximal end portion of said bar end, where the outer sleeve has an interior surface defining a hollow chamber for accommodating said hollow end portion of said steerer bar;
  b. providing an expandable segmented nut which has at least two radially split segments;
  c. sliding said outer sleeve over said hollow end portion such that said outer sleeve conforms to and engages with said hollow end portion; and
  d. causing said segmented nut to split and expand radially inside said hollow end portion of said steerer bar, and binding said segmented nut to said proximal end portion of said bar end;
  e. whereby said outer sleeve provides protective support to said hollow end portion of said steerer bar so that it will not be damaged by any outward stress exerted by said expanded segmented nut.

19. The invention as defined in claim 18 further comprising the step of bonding said at least two segments of said segmented nut by an elastic retention ring.

20. The invention as defined in claim 18 further comprising the step of utilizing a movable wedge nut for squeezing said segmented nut to cause it to split and expand radially.

21. The invention as defined in claim 20 further comprising the step of providing a threaded bolt for causing said movable wedge nut to move for squeezing said segmented nut.

22. The invention as defined in claim 20 further comprising the step of utilizing a fixed wedge nut for squeezing said segmented nut from a direction opposite to said movable wedge nut.

23. A method for attaching a bar end to an end portion of a steerer bar to construct a handlebar system without damaging the end portion of the steerer bar, where the end portion of the steerer bar is a hollow tubing having two opposite surfaces including an exterior surface and an interior surface, the method comprising the following steps of:
  a. tightening a fastening means of said bar end to one of said two opposite surfaces of said hollow tubing for attaching the bar end to said steerer bar;
  b. engaging an extended brace to another one of said two opposite surfaces of said hollow tubing for supporting said hollow tubing so that it will not be damaged by any stress exerted by said fastening means; and
  c. wherein said extended brace is an outer sleeve engageable to said exterior surface of said hollow tubing, and said fastening means includes an expandable segmented nut engageable to said interior surface of said hollow tubing.

* * * * *